United States Patent
Siraj et al.

(10) Patent No.: US 10,536,945 B2
(45) Date of Patent: Jan. 14, 2020

(54) SPLITTING COMMUNICATION CHANNELS

(71) Applicant: Hewlett Packard Enterprise Development LP, Houston, TX (US)

(72) Inventors: Shahnawaz Siraj, San Jose, CA (US); Sachin Ganu, San Jose, CA (US); Eldad Perahia, Santa Clara, CA (US); Charles Lukaszewski, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/885,561

(22) Filed: Jan. 31, 2018

(65) Prior Publication Data
US 2019/0239225 A1    Aug. 1, 2019

(51) Int. Cl.
| | | |
|---|---|---|
| *H04W 72/04* | (2009.01) | |
| *H04L 12/24* | (2006.01) | |
| *H04W 24/02* | (2009.01) | |
| *H04W 8/24* | (2009.01) | |
| *H04L 5/00* | (2006.01) | |
| *H04W 88/06* | (2009.01) | |
| *H04W 84/12* | (2009.01) | |
| *H04W 16/14* | (2009.01) | |
| *H04B 7/0452* | (2017.01) | |

(52) U.S. Cl.
CPC ..... *H04W 72/0453* (2013.01); *H04L 41/0823* (2013.01); *H04L 41/0893* (2013.01); *H04L 41/0896* (2013.01); *H04W 8/24* (2013.01); *H04W 24/02* (2013.01); *H04B 7/0452* (2013.01); *H04L 5/0007* (2013.01); *H04W 16/14* (2013.01); *H04W 84/12* (2013.01); *H04W 88/06* (2013.01)

(58) Field of Classification Search
CPC . H04W 72/0453; H04W 16/14; H04W 88/06; H04W 84/12; H04B 7/0452; H04L 5/0007
See application file for complete search history.

(56) References Cited

U.S. PATENT DOCUMENTS 8,509,159 B2 *  8/2013  Shao ............... H04W 72/02  370/329
9,288,228 B2 *  3/2016  Suumaki ........... H04W 12/04
(Continued)

OTHER PUBLICATIONS

European Partial Search Report and Search Opinion Received for EP Application No. 19152853.8, dated Jul. 10, 2019, 18 pages.

*Primary Examiner* — Dady Chery
(74) *Attorney, Agent, or Firm* — Brooks, Cameron & Huebsch, PLLC

(57) ABSTRACT

In some examples, a non-transitory machine-readable medium can include instructions executable by a processing resource of a network device to: receive a first message on a communication band from a first wireless client device; determine a capability complying with a particular wireless specification of the first wireless client device based on information in the first message; split communication channels on the communication band into a first communication channel group and a second communication channel group; and operate the first communication channel group in accordance with the particular wireless specification and the second communication channel group in accordance with other wireless specifications.

19 Claims, 4 Drawing Sheets

(56) References Cited

U.S. PATENT DOCUMENTS

| | | | |
|---|---|---|---|
| 2011/0235591 A1* | 9/2011 | Iyer | H04L 5/0064 370/328 |
| 2012/0243474 A1* | 9/2012 | Iyer | H04L 63/1466 370/328 |
| 2012/0275320 A1* | 11/2012 | Iyer | H04W 16/14 370/252 |
| 2014/0120889 A1* | 5/2014 | Shuman | H04W 76/45 455/416 |
| 2015/0207578 A1 | 7/2015 | Ramamurthy et al. | |
| 2015/0271829 A1 | 9/2015 | Amini et al. | |

\* cited by examiner

SPLITTING COMMUNICATION CHANNELS

BACKGROUND

An antenna can generate and/or receive electromagnetic waves. A network device can include multiple radio chains with multiple antennas. The network device such as a multiple-input and multiple-output (MIMO) network device can utilize different radio communication channels and a different communication bands to send and receive more than one data signals simultaneously. The network device can operate in accordance with a wireless specification. A wireless specification such as those created by the Institute of Electrical and Electronics Engineers (IEEE) LAN/MAN Standards Committee (IEEE 802) provide media access control (MAC) and physical layer (PHY) specifications for implementing wireless local area network (WLAN) computer communication.

DETAILED DESCRIPTION

Figure 1:
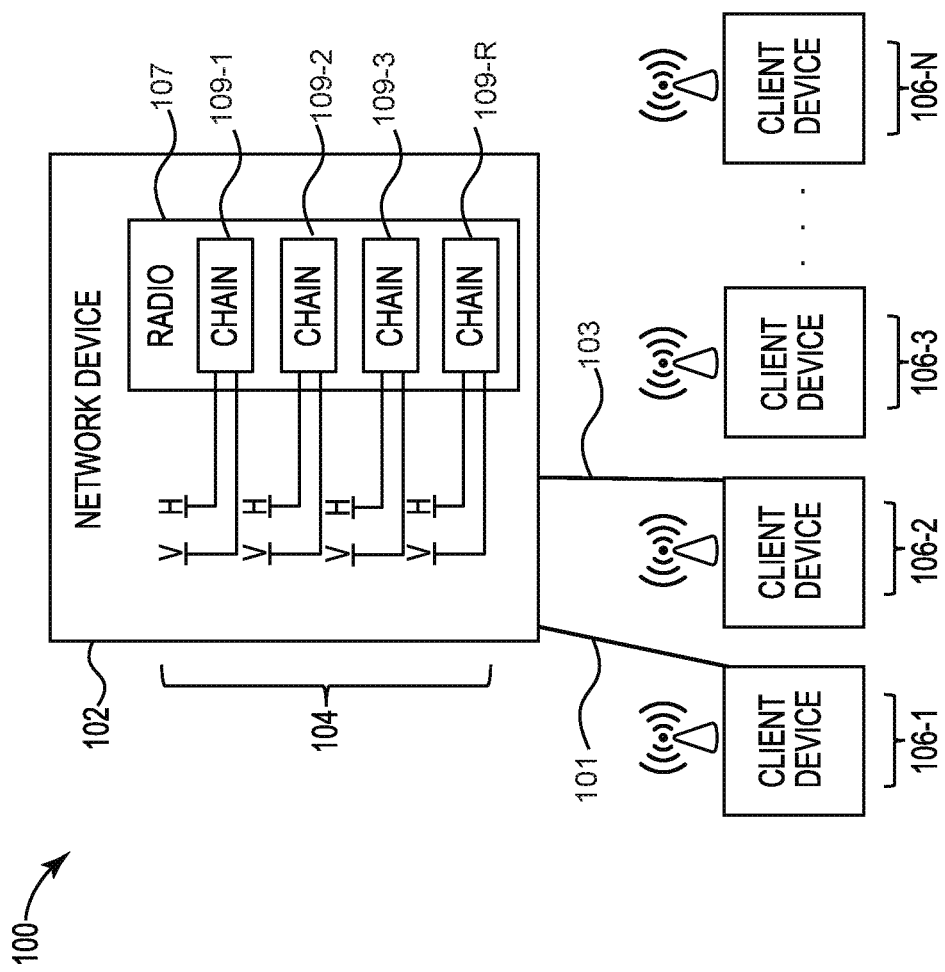
FIG. 1 illustrates an example of a network layout consistent with the disclosure.

A network device can use a radio chain to transmit and/or receive information. The information can be transmitted and/or received via a network. As used herein, the term "radio chain" refers to hardware that can transmit and/or receive information via radio signals. Wireless client devices and/or other wireless devices can communicate with the network device on a communication channel using multiple radio chains. As used herein, the term communication channel refers to a frequency or frequency range utilized by a network device to communicate (e.g., transmit and/or receive) information.

A network device such as a MIMO network device can use multiple radio chains to transmit and/or receive information. A radio chain can include two antennas such as a horizontal antenna and a vertical antenna, among other possibilities. As used herein, the term "antenna" refers to a device that converts electric power into radio waves, and/or vice versa.

As mentioned, a network device can operate in accordance with a wireless specification such as those created by the IEEE. However, over time wireless specifications and the capabilities provided thereby have changed. As a result, some wireless client devices may not have a capability to comply with all aspects/capabilities of the most recent wireless specification at any given point in time.

For instance, IEEE 802.11ax is a wireless standard specification that facilitates different wireless capabilities as compared to those capabilities of earlier released (i.e., legacy) wireless specifications. However, some wireless client devices may not have a capability of complying with capabilities of the different wireless operation in accordance with the IEEE 802.11ax standard. As a result, coexistence of wireless client devices without a capability complying with a capability of the IEEE 802.11ax wireless specification and those having a capability of complying with various capabilities as specified in IEEE 802.11ax standard may result in inefficiencies such as delays scheduling of wireless client devices having the capability of complying with the IEEE 802.11ax wireless specification capabilities. Some approaches can attempt to address the same by assigning AP's within a given coverage area to a particular communication channel on a given communication band. However, coverage based approaches may lead to gaps in wireless coverage or may otherwise be ineffective.

Accordingly, the disclosure is directed to splitting communication channels. For instance, communication channels on a communication band (e.g., 5.0 GHz UNII band) can be split into a first communication channel group to operate in accordance with a particular wireless specification and a second communication channel group to operate in accordance with other wireless specifications, as described herein. Such splits can desirably facilitate the improved wireless operations with wireless client devices having a capacity of complying with the particular wireless specification (e.g., an IEEE 802.11ax wireless specification) and yet provide a desired level of service to wireless client devices without a capacity of complying with the particular wireless specification, as described herein.

In various examples, a communication band can be a 5.0 GHz Universal National Information Infrastructure (UNII) band. However, other communication bands (e.g., a 2.4 GHz band) are possible.

In various examples, a particular wireless specification can refer to a most recent wireless specification at a given time. In some examples, a particular wireless specification can correspond to an IEEE 801.11 ax wireless specification, among other possibilities.

In various examples, the other wireless specifications can refer to a wireless specification that is (or a combination of wireless specifications) older (in terms of release date) than the particular wireless specification. For instance, assuming a later release date of IEEE 802.11 ax, the other specifications can then refer to an IEEE 802.11 ac wireless specification, an IEEE 802.11 n wireless specification, an IEEE 802.11 a, an IEEE 802.11 b, an IEEE 802.11 g, and/or a combination thereof, among other possibilities. For instance, wireless specifications can be backwards compatible such that the other wireless specification can include a given wireless specification and prior versions of the given wireless specification.

FIG. 1 illustrates an example of a network layout 100 consistent with the disclosure. As illustrated in FIG. 1, the network layout 100 can include network device 102, antennas 104, and wireless client devices 106-1, 106-2, 106-3, ... 106-N (referred to collectively as wireless client devices or client devices 106).

Network device 102 can split communication channels based on a wireless specification of a wireless client device. As used herein, the term "network device" can, for example, refer to a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

In some examples, network device 102 can be an access point (AP). An AP can refer to a networking device that allows a wireless client device to connect to a wired or wireless network. As used herein, the term "access point" (AP) can, for example, refer to receiving points for any known or convenient wireless access technology which can later become known. Specifically, the term AP is not intended to be limited to IEEE 802.11-based APs. APs function as an electronic device that is adapted to allow wireless devices to connect to a wired network via various communications standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include a memory resource, including read-write memory, and a hierarchy of persistent memory such as ROM, EPROM, and Flash memory.

In some examples, network device 102 can be a controller. The controller can include a processing resource such as a processing resource, memory, and input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. A controller can include a memory resource, including read-write memory, and a hierarch of persistent memory such as ROM, EPROM, and Flash memory.

As used herein, the term "wireless client device" can, for example, refer to a device including a processing resource, memory, and input/output interfaces for wired and/or wireless communication. For example, a wireless client device can include a laptop computer, a desktop computer, a mobile device, and/or other wireless devices, although examples of the disclosure are not limited to such devices. A mobile device can, for example, refer to devices that are (or can be) carried and/or worn by a user. For instance, a mobile device can be a phone (e.g., a smart phone), a tablet, a personal digital assistant (PDA), smart glasses, and/or a wrist-worn device (e.g., a smart watch), among other types of mobile devices.

Wireless client devices 106 can connect to network device 102 via a network relationship. As used herein, the term "network relationship" can, for example, refer to a local area network (LAN), VLAN, wide area network (WAN), personal area network (PAN), a distributed computing environment (e.g., a cloud computing environment), storage area network (SAN), Metropolitan area network (MAN), a cellular communications network, and/or the Internet, among other types of network relationships.

Network device 102 can include a plurality of antennas 104. Network device 102 can include a radio 107 including four chains, 109-1, 109-2, 109-3, and 109-R where each radio chain includes two antennas. For instance, each radio chain can include a horizontal antenna and a vertical antenna, among other possibilities. As shown in FIG. 1, network device 102 can be a 4×4 multiple-inputs, multiple-outputs (MIMO) network device such as a 4×4 MIMO network device 102, among other types of MIMO network devices. Here, a 4×4 MIMO network device has four radio chains with each radio chain available for both transmitting and receiving data. That is, although network device 102 is shown in FIG. 1 and described as a 4×4 MIMO network device, examples of the disclosure are not so limited. For example, network device 102 can be a MIMO network device with smaller than a 4×4 antenna and radio chain configuration, or a MIMO network device with greater than a 4×4 antenna and radio chain configuration.

Although not shown in FIG. 1 for clarity and so as not to obscure examples of the disclosure, each of the radio chains can be connected to the plurality of antennas 104 via a radio frequency (RF) switch. In some examples, a first portion of the plurality of radio chains (e.g., radio chain 109-3 and 109-R) can be dedicated to the first communication channel 101 in the first communication channel group, where a second portion of the plurality of radio chains (e.g., 109-1 and 109-2) can be dedicated to a communication channel 103 in the second communication channel group. For instance, a total number of the plurality of radio chains can be equal to the sum of the first portion and the second portion of the plurality of radio chain, among other possibilities.

As used herein, the term "switch" can, for example, refer to a computer networking device that connects devices together on a network by using, for example, packet switching to receive, process and forward data to a destination device. For example, a switch can include memory, including read-write memory, and a hierarch of persistent memory such as ROM, EPROM, and Flash memory.

As mentioned, in some examples the communication band can be a 5.0 GHz UNII band. Communication channels (and mid-point frequencies) operating on the 5 GHz communication band can include 36 (5.180 GHz), 40 (5.200 GHz) 44 (5.220 GHz), and 149 (5.745 GHz), among others. In such examples, network device 102 can provide network connectivity to wireless client devices 106-1 on a communication channel 101 (e.g., communication channel 36) included in a first communication channel group that is different from another communication channel 103 (e.g., communication channel 44) included in a second communication channel group that provides network connectivity to a different wireless client device such as wireless client device 106-2. That is, communication channel 101 is a communication channel that is different from communication channel 103. While illustrated as an individual communication channel it is understood that the first communication channel group and/or the second communication channel group can include a plurality of communication channels.

In some examples, the first communication channel group can include a plurality of communication channels with each communication channel of the plurality of communication channels is to operate on a communication band (e.g., 5.0 GHz UNII band) and operate in accordance with the particular wireless specification (e.g., IEEE 802.11 ax). For example, by operating in accordance with the particular specification such as IEEE 802.11 ax each communication channel in the first communication channel group can employ orthogonal frequency-division multiple access (OFDMA), spatial reuse, uplink multiuser multiple-input and multiple-output (UL MU-MIMO), and/or combinations thereof. By extension, a wireless client device having a capacity of complying with the particular wireless specification can, in such examples, have the capacity for employing orthogonal frequency-division multiple access (OFDMA), spatial reuse, uplink multiuser multiple-input and multiple-output (UL MU-MIMO), and/or combinations thereof.

Conversely, a wireless client device without a capacity of complying with the particular wireless specification can be without the capacity for employing any (or at least one of) OFDMA, spatial reuse, UL MU-MIMO. However, as mentioned that specification is not so limited as the particular specification and capabilities provided thereby can evolve and change over time.

In some examples, the second communication channel group can include a plurality of communication channels where each communication channel of the plurality of communication channels operates on the communication band (e.g., 5.0 GHz UNII band) and operate in accordance with other wireless specifications (e.g., IEEE 802.11 ac). For example, by operating in accordance with the other wireless specifications such as IEEE 802.11 ac each communication channel in the first communication channel group can operate without employing OFDMA, spatial reuse, UL MU-MIMO, and/or combinations thereof, among other possibilities.

Figure 2:
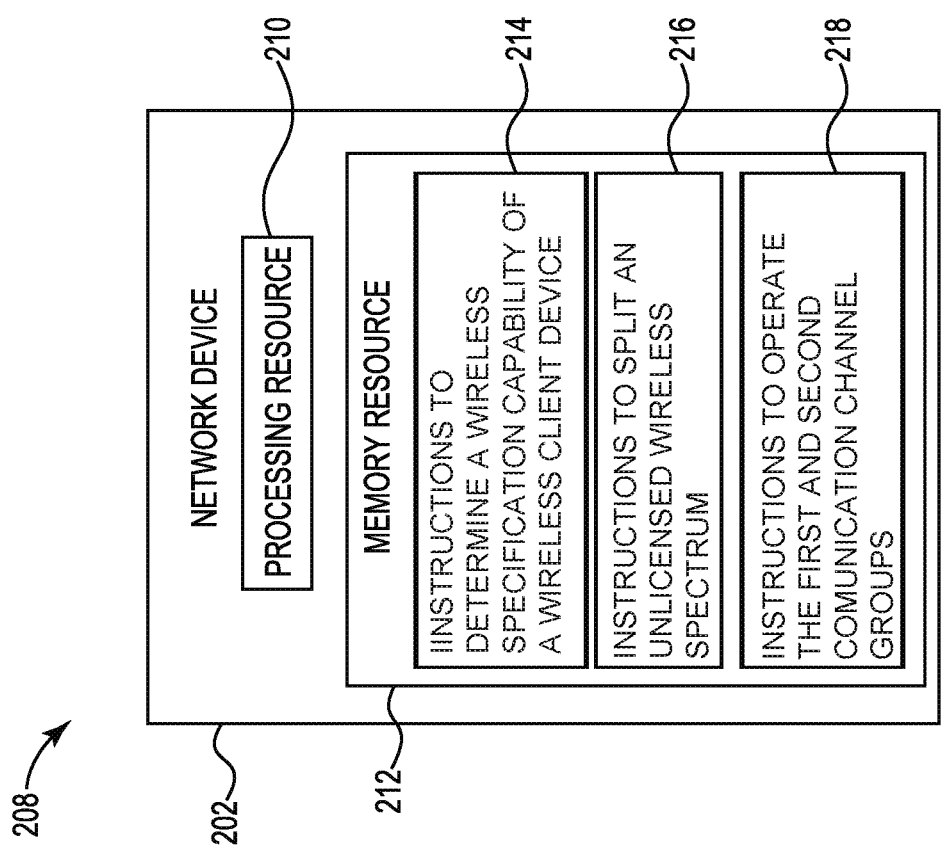
FIG. 2 is a block diagram of an example of a network device for splitting communication channels consistent with the disclosure.

FIG. 2 is a block diagram 208 of an example network device 202 for splitting communication channels consistent with the disclosure. As described herein, the network device 202 (e.g., network device 102, described in connection with FIG. 1) can perform a function related to splitting communication channels. Although the following descriptions refer to an individual processing resource and an individual machine-readable storage medium, the descriptions can also apply to a system with multiple processing resources and multiple machine-readable storage mediums. In such examples, the network device 202 can be distributed across multiple machine-readable storage mediums and the network device 202 can be distributed across multiple processing resources. Put another way, the instructions executed by the network device 202 can be stored across multiple machine-readable storage mediums and executed across multiple processing resources, such as in a distributed or virtual computing environment.

As illustrated in FIG. 2, the network device 202 can comprise a processing resource 210, and a memory resource 212 storing machine-readable instructions 214, 216, 218 to cause the processing resource 210 to perform an operation relating to splitting communication channels. That is, using the processing resource 210 and the memory resource 212, the network device 202 can split communication channels on the unlicensed wireless spectrum into a first communication channel group and a second communication channel group, among other operations. Processing resource 210 can be a central processing unit (CPU), microprocessor, and/or other hardware device suitable for retrieval and execution of instructions stored in memory resource 212.

The network device 202 can include instructions 214 stored in the memory resource 212 and executable by the processing resource 210 to determine a wireless specification capability of a wireless client device. For example, network device 202 can include instructions 214 stored in the memory resource 212 and executable by the processing resource 210 to determine a wireless specification capability of a first wireless client device operating on an unlicensed wireless spectrum, among other operations.

The network device 202 can include instructions 216 stored in the memory resource 212 and executable by the processing resource 210 to split the unlicensed wireless spectrum. For example, network device 202 can include instructions 216 stored in the memory resource 212 and executable by the processing resource 210 to split communication channels on the unlicensed wireless spectrum into a first communication channel group and a second communication channel group, as described herein. It is noted that in some examples the unlicensed wireless spectrum can be split into a greater total number of communication channel groups such as a first communication channel group, a second communication channel group, and a third communication channel group, among other possibilities. Stated differently, the plurality of radio chains can be split into any suitable number of radio chains such as a first portion, a second portion, and a third portion of the plurality of radio chains, among other possibilities.

The network device 202 can include instructions 218 stored in the memory resource 212 and executable by the processing resource 210 to operate the first and second communication channel groups. For example, network device 202 can include instructions 218 stored in the memory resource 212 and executable by the processing resource 210 to operate the first communication channel group in accordance with a particular wireless specification and the second communication channel group in accordance with other wireless specifications when the first wireless client device does not have a capability complying with the particular wireless specification. In this manner, the network device 202 can determine a wireless specification capability of a wireless client device (operating on an unlicensed wireless spectrum), split the unlicensed wireless (e.g., into a first communication channel group and a second communication channel group), and operate the first communication channel group (e.g., in accordance with the particular wireless specification) and the second communication channel group (e.g., in accordance with other wireless specifications).

Figure 3:
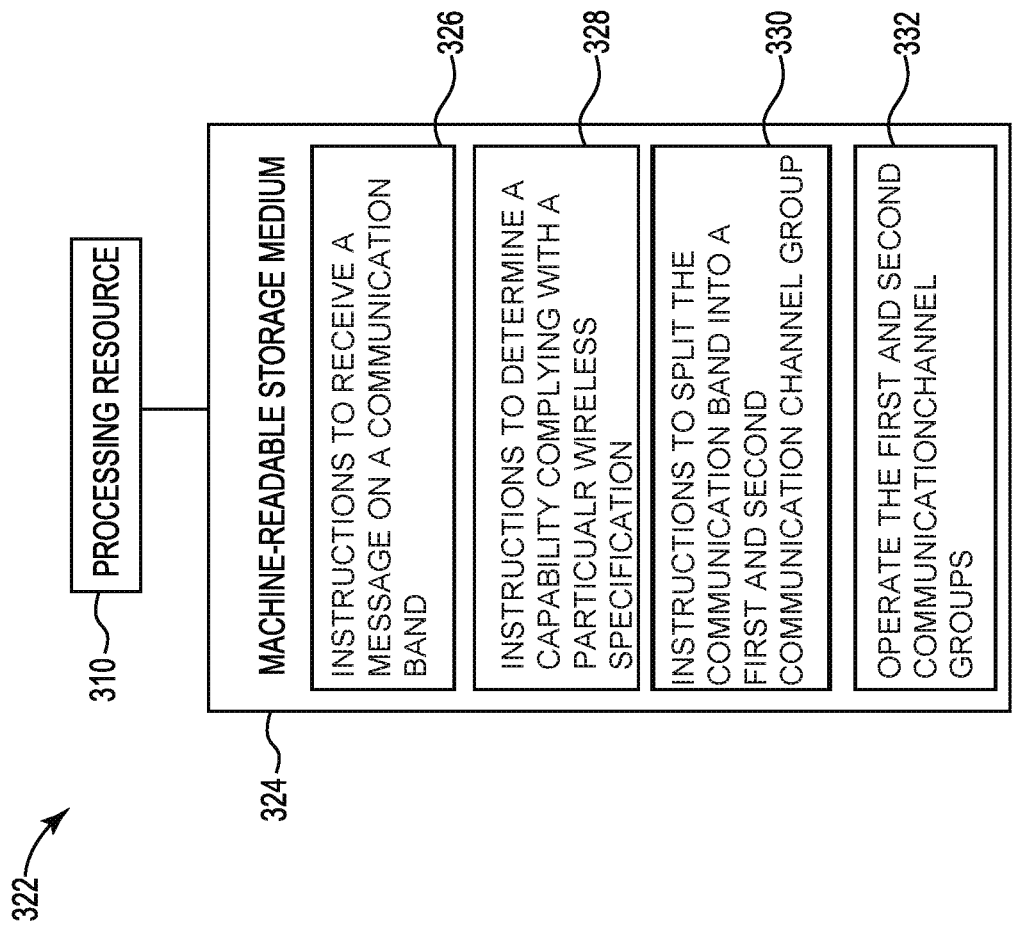
FIG. 3 is a block diagram of an example of a system consistent with the disclosure.

FIG. 3 is a block diagram of an example of a system 322, consistent with the disclosure. System 322 can include a processing resource 310 (e.g., processing resource 210, described in connection with FIG. 2) and a machine-readable storage medium 324, as illustrated in FIG. 3. Although the following descriptions refer to an individual processing resource and an individual machine-readable storage medium, the descriptions can also apply to a system with multiple processing resources and multiple machine-readable storage mediums. In such examples, the instructions can be distributed across multiple machine-readable storage mediums and the instructions can be distributed across multiple processing resources. Put another way, the instructions can be stored across multiple machine-readable storage mediums and executed across multiple processing resources, such as in a distributed computing environment.

Processing resource 310 can be a central processing unit (CPU), microprocessor, and/or other hardware device suitable for retrieval and execution of instructions stored in machine-readable storage medium 324. In the particular example shown in FIG. 3, processing resource 310 can receive, determine, and send instructions 326, 328, 330, and 332. As an alternative or in addition to retrieving and executing instructions, processing resource 310 can include an electronic circuit comprising an electronic component for performing the operations of the instructions in machine-readable storage medium 324. With respect to the executable instruction representations or boxes described and shown herein, it should be understood that part or all of the executable instructions and/or electronic circuits included within one box can be included in a different box shown in the figures or in a different box not shown.

Machine-readable storage medium 324 can be any electronic, magnetic, optical, or other physical storage device that stores executable instructions. Thus, machine-readable storage medium 324 can be, for example, Random Access Memory (RAM), an Electrically-Erasable Programmable Read-Only Memory (EEPROM), a storage drive, an optical disc, and the like. The executable instructions can be "installed" on the system 322 illustrated in FIG. 3. Machine-readable storage medium 324 can be a portable, external or remote storage medium, for example, that allows the system 322 to download the instructions from the portable/external/remote storage medium. In this situation, the executable instructions can be part of an "installation package". As described herein, machine-readable storage medium 324 can be encoded with executable instructions related to splitting communication channels.

Instructions to receive a message on a communication band 326, when executed by processing resource 310, can cause system 322 to receive a first message on a communication band from a first wireless client device or another wireless client device. The message can be received via a radio such as those described herein. The message can be received in response to a message sent to a wireless client device (such as probe message) and/or responsive to a wireless client device (e.g., wireless client device 106, described in connection with FIG. 1) associating with the network device (e.g., network device 102, 202, described in connection with FIGS. 1 and 2, respectively), among other possibilities.

Instructions to determine a capability complying with a particular wireless specification 328, when executed by processing resource 310, can cause system 322 to determine a capability complying with a particular wireless specification of the first wireless client device based on information in the first message (i.e., a first wireless message). Determining the capability can be based on information included in and/or a format of the first message. For instance, in some examples, a wireless specification capability can be determined based on information in a packet header, a packet type and/or subtype decoded from the packet header of the first message. As used herein, the term "information" can, for example, refer to data, addresses, control, management (e.g., statistics) or any combination thereof, among other information. For data transmission, information can be transmitted as a message, namely a collection of bits in a predetermined format. A message such as wireless message can include a header and payload data having a predetermined number of bits of information. The wireless message can be placed in a format as a plurality of packets, frames or cells. In some examples, determining can include determining a capably complying with a particular wireless specification based on information including in a management packet or other type of packet.

Instructions to split the communication band into a first communication channel group and a second communication channel group 330, when executed by processing resource 310, can cause system 322 to split communication channels on the communication band into a first communication channel group and a second communication channel group, as described herein.

Instructions to operate the first and second communication channel groups 332, when executed by processing resource 310, can cause system 322 operate in the first communication channel group in accordance with the particular wireless specification and the second communication channel group in accordance with other wireless specifications. For example, when a first wireless client device has a capability complying with the particular wireless specification and a second wireless client device has a capability complying with another wireless specification the first wireless client device can operate on the first communication channel group and the second wireless client device can operate on the second communication channel group.

For instance, in some examples the Instructions 324 can include instructions to communicate with the first wireless client device on the first communication channel group when the first wireless client device is determined to have a capability of complying with the particular wireless specification. Similarly, in some examples the Instructions 324 can include instructions to communicate with the second wireless client device on the first communication channel group when the second wireless client device is determined to capability of complying with the other wireless specifications but does not have a capability of complying with the particular wireless specification (lacking at least some capabilities of the particular wireless specification). It is understood that any number of wireless client device can communicate on the first communication channel group and that any number of wireless client devices can communicate on the second communication channel group.

Figure 4:
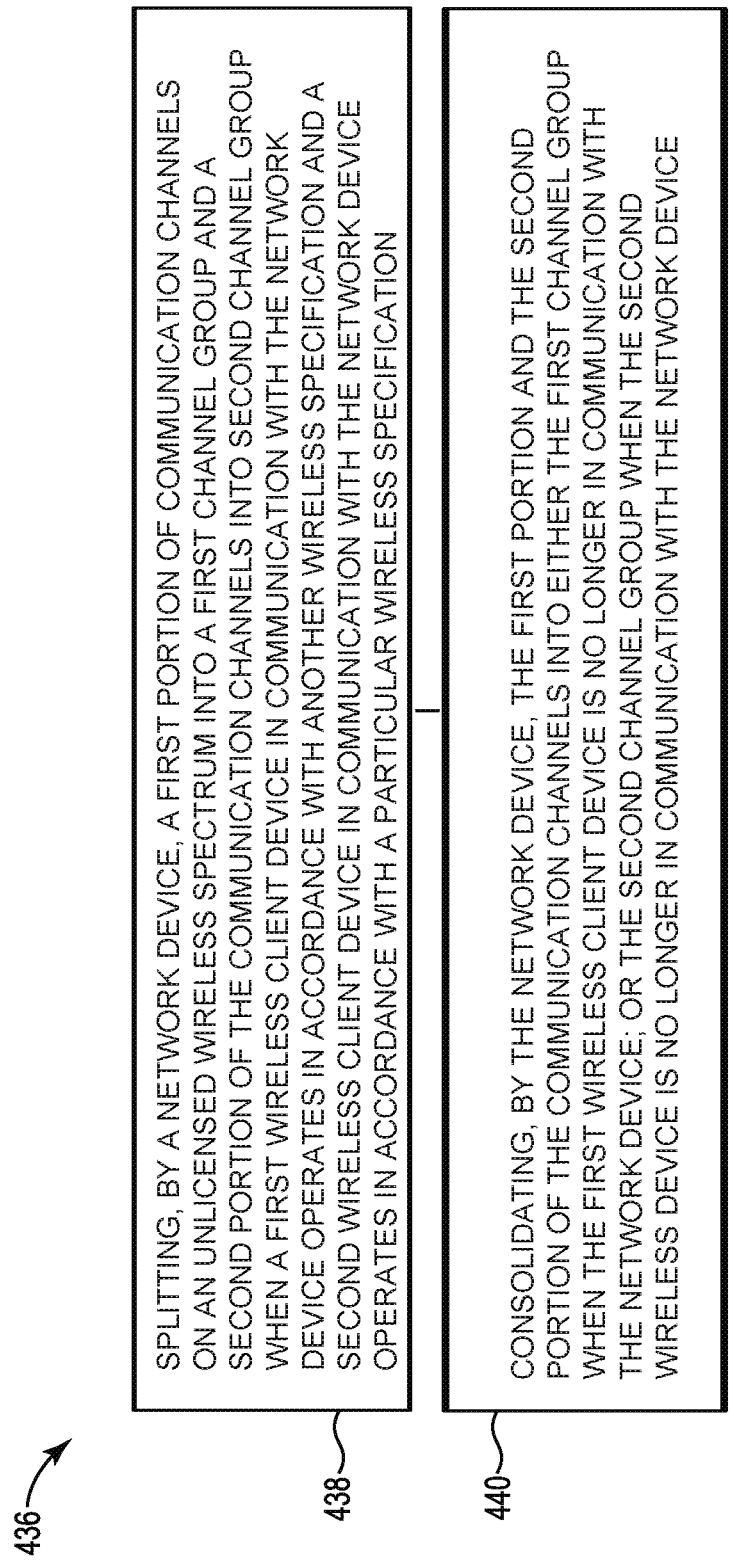
FIG. 4 illustrates an example of a method consistent with the disclosure.

FIG. 4 illustrates an example of a method 436 consistent with the disclosure. Method 436 can be performed by a network device (e.g., network device 102, 202, described in connection with FIGS. 1 and 2, respectively).

At 438, the method 436 can include splitting, by a network device, a first portion of communication channels on an unlicensed wireless spectrum (e.g., a 5.0 GHz UNII band or other band) into a first communication channel group and a second portion of the communication channels into second communication channel group. For instance, the method 436 can include splitting the communication channels into the first communication channel group and a second communication channel group when a first wireless client device in communication with the network device operates in accordance with other wireless specifications and a second wireless client device in communication with the network device operates in accordance with a particular wireless specification, among other possibilities.

At 440, the method 436 can include consolidating, by the network device, the first portion and the second portion of the communication channels into either the first communication channel group or the second communication channel group. For instance, the method 436 can include consolidating, by the network device, the first portion and the second portion of the communication channels into the first communication channel group when the first wireless client device is no longer in communication with the network device or the second communication channel group when the second wireless device is no longer in communication with the network device.

In such examples, consolidating at least some of the communication channels into either the first communication channel group or the second communication channel group can increase an overall capacity of the first communication channel group or the second communication channel group that receives the communication channels from the other of the first communication channel group or the second communication channel group. Stated differently, consolidating each communication channel of the communication channels on an unlicensed wireless spectrum into either the first communication channel group or the second communication channel group to increase an overall capacity of the first communication channel group or the second communication channel group (whichever group receives the consolidated communication channels).

Method 436 can be repeated. In some examples, method 436 can be repeated for a new wireless client device in response to the new wireless client device associating with the network device. In some examples, method 436 can be repeated for an existing wireless client device after a threshold period of time, although examples of the disclosure are not limited to repeating method 436 for an existing wireless client device after a threshold period of time.

In some examples, method 436 can steer client devices associating with the network device to a suitable communication channel group. That is, in some examples, a wireless client device can be steered to a communication channel on a given communication band or to another communication channel on the communication band. For example, a wireless client device such as second wireless client device can be steered to either a communication channel in the first communication channel group when it is determined the wireless client has the capability of complying with particular wireless specification capability or to a communication channel in the second communication channel group when it is determined the second wireless client device does not have the capability of complying with the particular wireless specification. Such band steering reduces interference on the given communication band (e.g., the 5 GHz UNII band) between wireless client devices that have a capability complying with a particular wireless specification and those wireless client devices which do not have a capability complying with the particular wireless specification. Such steering can occur at a controller, access point, or other network device.

In some examples, steering a wireless client device can include steering the wireless client device to either a first BSS identifier of the first communication channel group or a second BSS identifier of the second communication channel group. In such examples, the first BSS identifier can be a different identifier than the second BSS identifier and therefore from the perspective of the wireless client device can be viewed as distinct entities/devices. However, the disclosure is not so limited. Rather, in some examples, steering can include steering the wireless client device to a first BSS identifier have a first set of capabilities (e.g., those consistent with operation on IEEE 802.11 ax) whereas the second BSS identifier can be the same identifier as the first BSS identifier but with a second set of capabilities (e.g., those consistent with operation on IEEE 802.11 ac but not 802.11 ax).

In the foregoing detailed description of the disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the disclosure.

The figures herein follow a numbering convention in which the first digit corresponds to the drawing figure number and the remaining digits identify an element or component in the drawing. Similar elements or components between different figures can be identified by the use of similar digits. For example, 102 can reference element "02" in FIG. 1, and a similar element can be referenced as 202 in FIG. 2. Elements shown in the various figures herein can be added, exchanged, and/or eliminated so as to provide a plurality of additional examples of the disclosure. In addition, the proportion and the relative scale of the elements provided in the figures are intended to illustrate the examples of the disclosure, and should not be taken in a limiting sense. As used herein, the designator "N", particularly with respect to reference numerals in the drawings, indicates that a plurality of the particular feature so designated can be included with examples of the disclosure. The designators can represent the same or different numbers of the particular features. Further, as used herein, "a plurality of" an element and/or feature can refer to more than one of such elements and/or features.

What is claimed:

1. A non-transitory machine-readable medium including instructions executable by a processing resource of a network device to:
    receive messages from a plurality of wireless client devices on a communication band, including at least a first message received from a first wireless client device and a second message received from a second wireless device;
    determine a capability of each of the plurality of wireless devices for complying with one or more of a plurality of wireless specifications based on information in the messages from the plurality of wireless devices;
    upon determining that the capabilities of at least the first wireless device and the second wireless device for complying with the plurality of wireless specifications are different, split communication channels on the communication band into a plurality of communication channel groups based on the determined capabilities of the plurality of wireless devices, including at least a first portion of the communication channels for a first communication channel group and a second portion of the communication channels for a second communication channel group; and
    operate each of the communication channel groups according to a respective specification of the plurality of wireless specifications, including operating the first communication channel group in accordance with a first wireless specification and operating the second communication channel group in accordance with a second wireless specification.

2. The medium of claim 1, wherein the messages from the plurality of client devices are management packets, and the medium further comprising instructions to determine the capability of each of plurality of wireless devices complying with one or more of the wireless specifications based on information in the management packets.

3. The medium of claim 1, wherein the first communication channel group includes a first plurality of communication channels, each communication channel of the plurality of communication channels operating on the communication band in accordance with a first wireless specification, and wherein the second communication channel group includes a second plurality of communication channels, each communication channel of the plurality of communication channels operating on the communication band in accordance with a second wireless specification.

4. The medium of claim 3, wherein each communication channel of the plurality of communication channels in the first communication channel group operates in accordance with the first wireless specification by employing orthogonal frequency-division multiple access (OFDMA), spatial reuse, uplink multiuser multiple-input and multiple-output (UL MU-MIMO), or combinations thereof.

5. The medium of claim 3, wherein each communication channel of the plurality of communication channels in the second communication channel group operates in accordance with the second wireless specifications by operating without employing any of orthogonal frequency-division multiple access (OFDMA), spatial reuse, uplink multiuser multiple-input and multiple-output (UL MU-MIMO).

6. The medium of claim 1, wherein the communication band is a 5.0 GHz Universal National Information Infrastructure (UNII) band.

7. The medium of claim 1, wherein each of the wireless specifications corresponds to an Institute of Electrical and Electronic Engineers (IEEE) 802.11 ac wireless specification, an IEEE 802.11 n wireless specification, an IEEE 802.11 a, an IEEE 802.11 b, an IEEE 802.11 g, or a combination thereof, and wherein the particular wireless specification corresponds to an IEEE 802.11 ax wireless specification.

8. The medium of claim 1, further comprising instructions to:
upon ending communication with one or more wireless devices for a particular communication channel group of the plurality of communication channel groups, consolidate the portion of the communication channels for the particular communication channel group into one or more remaining communication channel groups.

9. A network device comprising:
a processing resource; and
a receiver to receive messages from a plurality of wireless client devices on a communication band, including at least a first message received from a first wireless client device and a second message received from a second wireless device;
a memory storing instructions executable by the processing resource to:
determine a capability of each of the plurality of wireless client devices operating on an unlicensed wireless spectrum for complying with one or more of a plurality of wireless specifications based on information in the messages from the plurality of wireless devices;
upon determining that the capabilities of at least the first wireless device and the second wireless device for complying with the plurality of wireless specifications are different, split communication channels on the unlicensed wireless spectrum into a plurality of communication channel groups based on the determined capabilities of the plurality of wireless devices, including at least a first portion of the communication channels for a first communication channel group and a second portion of the communication channels for a second communication channel group; and
operate each of the communication channel groups according to a respective specification of the plurality of specifications, including operating the first communication channel group in accordance with a first wireless specification and operating the second communication channel group in accordance with a second wireless specification.

10. The network device of claim 9, wherein the network device is a controller.

11. The network device of claim 9, wherein the network device is an access point.

12. The network device of claim 11, wherein the network device includes a plurality of antennas having a plurality of radio chains.

13. The network device of claim 12, wherein the network device is to dedicate a first portion of the plurality of radio chains to the first communication channel group and is to dedicate a second portion of the plurality of radio chains to the second communication channel group.

14. The network device of claim 9, further comprising instructions to:
steer the first wireless client to a communication channel in the first communication channel group; and
steer the second wireless client to a communication channel in the second communication channel group.

15. The network device of claim 14, wherein the instructions to steer the first and second wireless clients further comprise instructions to steer the first wireless client to a first BSS identifier of the first communication channel group and to steer the second wireless client to a second BSS identifier of the second communication channel group.

16. The network device of claim 15, wherein first BSS identifier is different than the second BSS identifier.

17. The network device of claim 9, wherein the memory further stores instructions to:
upon ending communication with one or more wireless devices for a particular communication channel group of the plurality of communication channel groups, consolidate the portion of the communication channels for the particular communication channel group into one or more remaining communication channel groups.

18. A method comprising:
receiving at a network device messages from a plurality of wireless client devices on a communication band, including at least a first message received from a first wireless client device and a second message received from a second wireless device;
determining a capability of each of the plurality of wireless devices for complying with one or more of a plurality of wireless specifications based on information in the messages from the plurality of wireless devices;
upon determining that the capabilities of at least the first wireless device and the second wireless device for complying with the plurality of wireless specifications are different, splitting, by the network device, communication channels on an unlicensed wireless spectrum into a plurality of communication channel groups based on the determined capabilities of the plurality of wireless devices, including at least a first portion of the communication channels for a first communication channel group and a second portion of the communication channels for a second communication channel group;
operating each of the communication channel groups according to a respective specification of the plurality of specifications, including operating the first communication channel group in accordance with a first wireless specification and operating the second communication channel group in accordance with a second wireless specification; and
consolidating, by the network device, the following portion of the communication channels into the plurality of communication channel groups upon either of the following occurring:
the first communication channel group when the first wireless client device is no longer in communication with the network device; or
the second communication channel group when the second wireless device is no longer in communication with the network device.

19. The method of claim 18, wherein consolidating the first or second communication channel group into the plurality of communication channel groups includes consolidating each communication channel of the communication channels on the unlicensed wireless spectrum into into the plurality of communication channel groups to increase an overall capacity of remaining communication channel groups of the plurality groups.

* * * * *